UNITED STATES PATENT OFFICE.

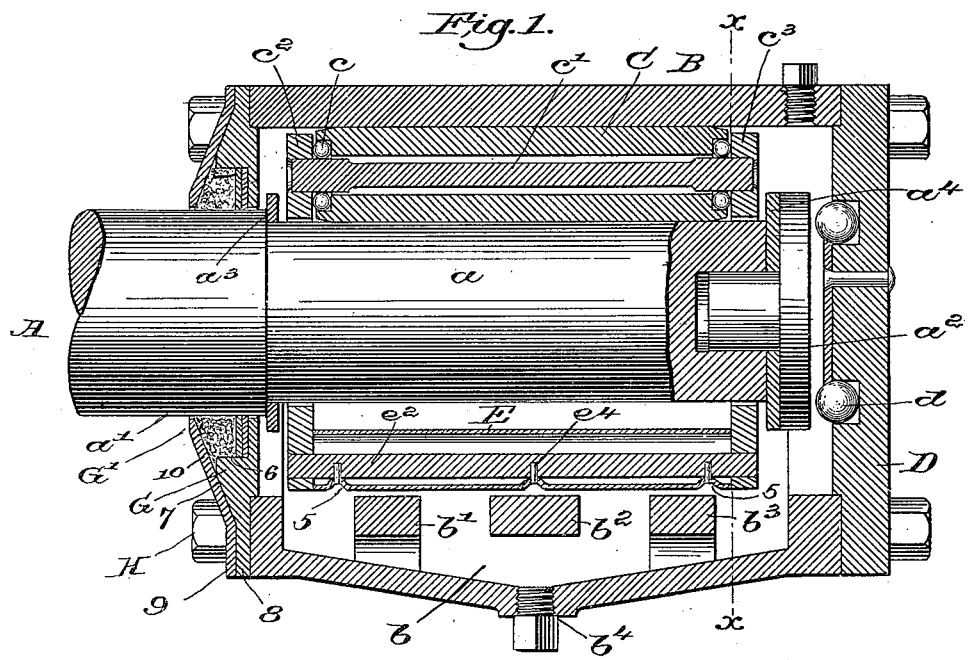

ROBERT D. CAMP, OF CHICAGO, ILLINOIS, ASSIGNOR TO THE MOFFETT BEARING COMPANY, OF COUNCIL BLUFFS, IOWA.

ROLLER-BEARING.

SPECIFICATION forming part of Letters Patent No. 667,647, dated February 5, 1901.

Application filed June 4, 1900. Serial No. 18,937. (No model.)

*To all whom it may concern:*

Be it known that I, ROBERT D. CAMP, a citizen of the United States, and a resident of Chicago, county of Cook, State of Illinois, have invented an Improvement in Roller-Bearings, of which the following description, in connection with the accompanying drawings, is a specification, like characters on the drawings representing like parts.

This invention has for its object the production of a novel roller-bearing having bearing-rollers mounted in a novel roller-cage, the bearing having also a novel dust-guard.

In the production of roller-bearings it is a great desideratum to make the traveling cages very strong and also as light in weight as possible, and I have succeeded in making a light-weight cage of great strength by employing hollow or skeleton bars interposed between the end rings of the cage, said bars being of such shape and size as to contact at their ends with the inner sides of the cage-rings and support the same in the direction of the circumference of the circular ends at substantially all points excepting only enough of the inner face thereof to enable the bearing-rollers to be put in position and revolve freely without contact with the cage or the roller-supports as the cage travels.

Figure 1, in longitudinal section, shows a roller-bearing containing my present improvement. Fig. 2 shows a sheet-metal blank from which to produce a cage-bar, said blank being represented as a metal tube. Fig. 3 is a section through the cage in the line $x$, Fig. 1, and Fig. 4 is a side elevation of a formed bar and its holding-rod. Figs. 5 and 6 show modified forms of my invention.

The journal $a$ is arranged at the end of the shaft A, said journal presenting two cage-controllers $a'$ $a^2$, each having at its inner side a facing composed of fiber in the shape of washers $a^3$ and $a^4$, the surrounding box B having at its under side a waste-receptacle $b$, crossed by supports $b'$ $b^2$ $b^3$, said box having a removable plug $b^4$ by which to open the space for the removal of waste from said receptacle, the bearing-rollers C, chambered at their ends to receive antifriction means, represented as balls $c$, interposed between the flanges of the rollers and the supports $c'$ and the cage ends $c^2$ $c^3$, said cage measured from one to its other end being of a length substantially less than the distance between the washers $a^3$ and $a^4$, so that said cage may run freely between said washers without contact therewith, and the box end D, having end-thrust means, represented as balls $d$, are and may be of any usual construction, said named devices not being herein claimed by me, as the same are not of my invention.

In the manufacture of the cage to secure lightness of structure I have formed the bars E, located between the bearing-rollers and contacting at their ends with the cage ends, hollow, the said bars being formed, preferably, from sheet metal or soft steel, and the material taken for the formation of these bars may and preferably will be in the form of a pipe $e$, as shown in Fig. 4. The pipe $e$ is in practice subjected to the action of suitable dies of a suitable shape to act upon the periphery of the pipe and bend the same into the shape represented by the cross-section of of the bar shown in Fig. 5. This novel hollow bar presents in cross-section a narrow inner edge 2, two like-concaved sides 3, and an outer face 4, said outer face being preferably depressed longitudinally midway its side edges, as at 5, thereby forming a rib which seats itself upon one side of a bar-holder $e^2$, represented as a rod, the ends of which are shaped to enter suitable openings $e'$ in the cage ends or "end walls," as I have designated said cage ends in the claims. The bar-holders $e^2$ after having been entered in the holes $e^3$ are confined therein by slightly upsetting the ends of the bars, as represented in Fig. 1, such upsetting confining the opposite ends of the bars E in place firmly in contact with the inner sides of the cage ends $c^2$ and $c^3$.

As an absolute preventive against turning of the bars on the bar-support $e^2$ I have shown the bottom of the depression 5 as provided with a series of holes which receive in them suitable rivets or studs $e^4$, three such rivets being represented in Fig. 1.

The cage ends have holes $f$, in which are entered the ends of the supports $c'$, said supports being prevented from turning in said holes and from sliding therein by upsetting, preferably, a part of the cage ends surrounding the holes to meet the ends of the supports c', which do not extend (see Fig. 1) flush with the outer edges of the cage ends.

The bearing-rollers C occupy a considerable portion of the faces of the cage ends, and it is very desirable to sustain as much as possible of the inner face of each cage end by means of the ends of the bars E, and if the bars were solid and they occupied a space equal to the space occupied by the hollow bars E (herein shown and described) then the roller-cages would be materially heavier than the cage herein described.

While I prefer that the bars be made from tubing molded into the shape represented, yet this invention would not be departed from were the hollow bars made from sheet metal by any other process. For instance, as in Fig. 5, the bar may be composed of metal bent or shaped in skeleton form, as represented, so that its edges enter a groove 23 in the bar-holder.

In Fig. 6, showing another modified form of skeleton or hollow bar, but one edge of the metal of the bar is inturned, as at 24, it entering a groove in the bar-holder.

This invention is not limited to the particular shape shown for the bar in cross-section, although the bars shown represent some of the best forms now known to me.

In practice the axle A at the inner end of the box will be surrounded by a dust-guard.

Having described my invention, what I claim as new, and desire to secure by Letters Patent, is—

1. In a roller-bearing, a cage composed of end walls, and independent hollow or skeleton bars the ends of which serve to determine the distance apart of said end walls.

2. In a roller-bearing, a cage composed of end walls, bar-holders carried by said walls, and metal bars composed of shells held in position between said end walls by said bar-holders.

3. In a roller-bearing, a cage composed of end walls, hollow or skeleton bars, and bar-holders located within said hollow or skeleton bars, the ends of said bar-holders entering and being secured in suitable holes in said end walls.

4. In a roller-bearing, a cage composed of end walls, skeleton or hollow bars, bar-holders entering at their ends suitable holes in the end walls and being therein fixed, and means to secure said skeleton or hollow bars to said bar-holders.

In testimony whereof I have signed my name to this specification in the presence of two subscribing witnesses.

ROBERT D. CAMP.

Witnesses:
JOHN B. FOLEY,
H. C. REILLY.